United States Patent
Schmode et al.

(10) Patent No.: US 7,096,760 B2
(45) Date of Patent: Aug. 29, 2006

(54) INSULATION STRIPPING TOOL

(75) Inventors: Hartmut Schmode, Blomberg (DE);
Günter Hanning, Detmold (DE);
Detlev Hetland, Detmold (DE);
Christian Heggemann, Detmold (DE);
Thomas Köster, Schlangen (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 24 days.

(21) Appl. No.: 11/044,556

(22) Filed: Jan. 28, 2005

(65) Prior Publication Data
US 2005/0166712 A1 Aug. 4, 2005

(30) Foreign Application Priority Data
Feb. 2, 2004 (DE) .................. 20 2004 001 580 U
Sep. 23, 2004 (DE) .................. 20 2004 014 801 U

(51) Int. Cl.
*H02G 1/12* (2006.01)
(52) U.S. Cl. ..................... 81/9.41; 81/9.4; 81/9.42; 81/9.43; 81/9.44
(58) Field of Classification Search ........... 81/9.4–9.44
See application file for complete search history.

(56) References Cited

U.S. PATENT DOCUMENTS

| | | | | |
|---|---|---|---|---|
| 2,842,992 A | * | 7/1958 | Hindenburg | 81/9.42 |
| 3,177,741 A | * | 4/1965 | De Bruin | 81/9.42 |
| 3,221,576 A | * | 12/1965 | Goetz | 81/9.43 |
| 3,515,018 A | * | 6/1970 | Metcalf | 81/9.42 |
| 6,220,119 B1 | * | 4/2001 | Krampe | 81/9.43 |

FOREIGN PATENT DOCUMENTS

DE    7933 957.4    3/1981

* cited by examiner

*Primary Examiner*—Joseph J. Hail, III
*Assistant Examiner*—Bryan Muller
(74) *Attorney, Agent, or Firm*—Lawrence E. Laubscher, Sr.; Lawrence E. Launscher, Jr.

(57) ABSTRACT

A pliers-type stripping tool includes a base, a pair of pivot levers pivotally connected with the base, a pair of clamping members connected for relative longitudinal displacement on one of the pivot levers, a pair of cutting members connected for relative longitudinal displacement on the other of the pivot levers, a first spring biasing the clamping jaws apart, a second spring biasing the cutting jaws apart, and a first operating arrangement operable by a pair of pivotally-connected handles to displace the clamping and cutting jaws together from their normal separated conditions toward adjacent positions in clamping and insulation-piercing engagement with an insulated conductor positioned therebetween. The cutting members sever a length of the insulation layer that extends concentrically around the conductor, and a second operating arrangement is operable by the handles to separate the pivot levers, thereby to strip the severed insulation layer from the bare conductor.

19 Claims, 13 Drawing Sheets

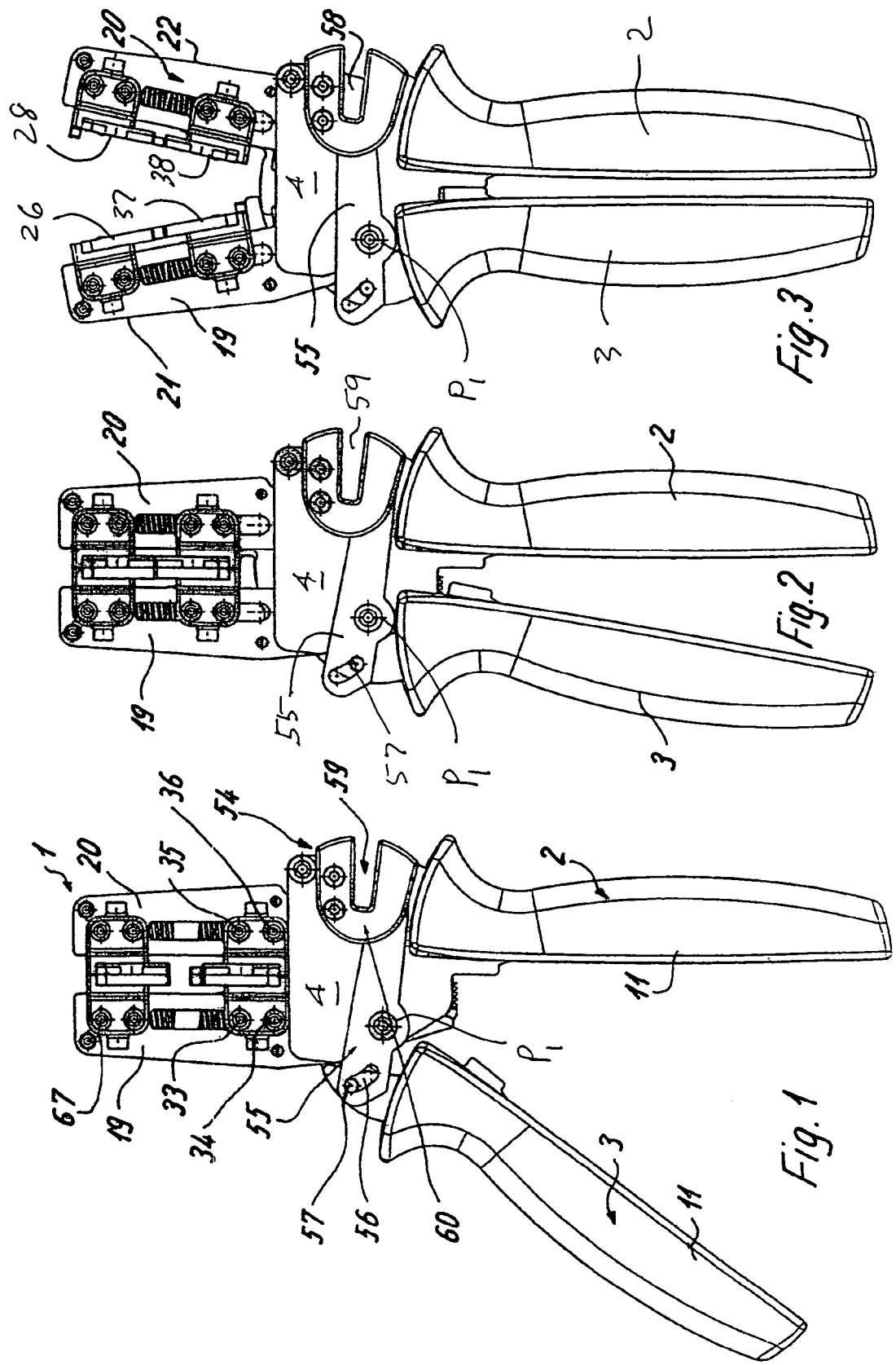

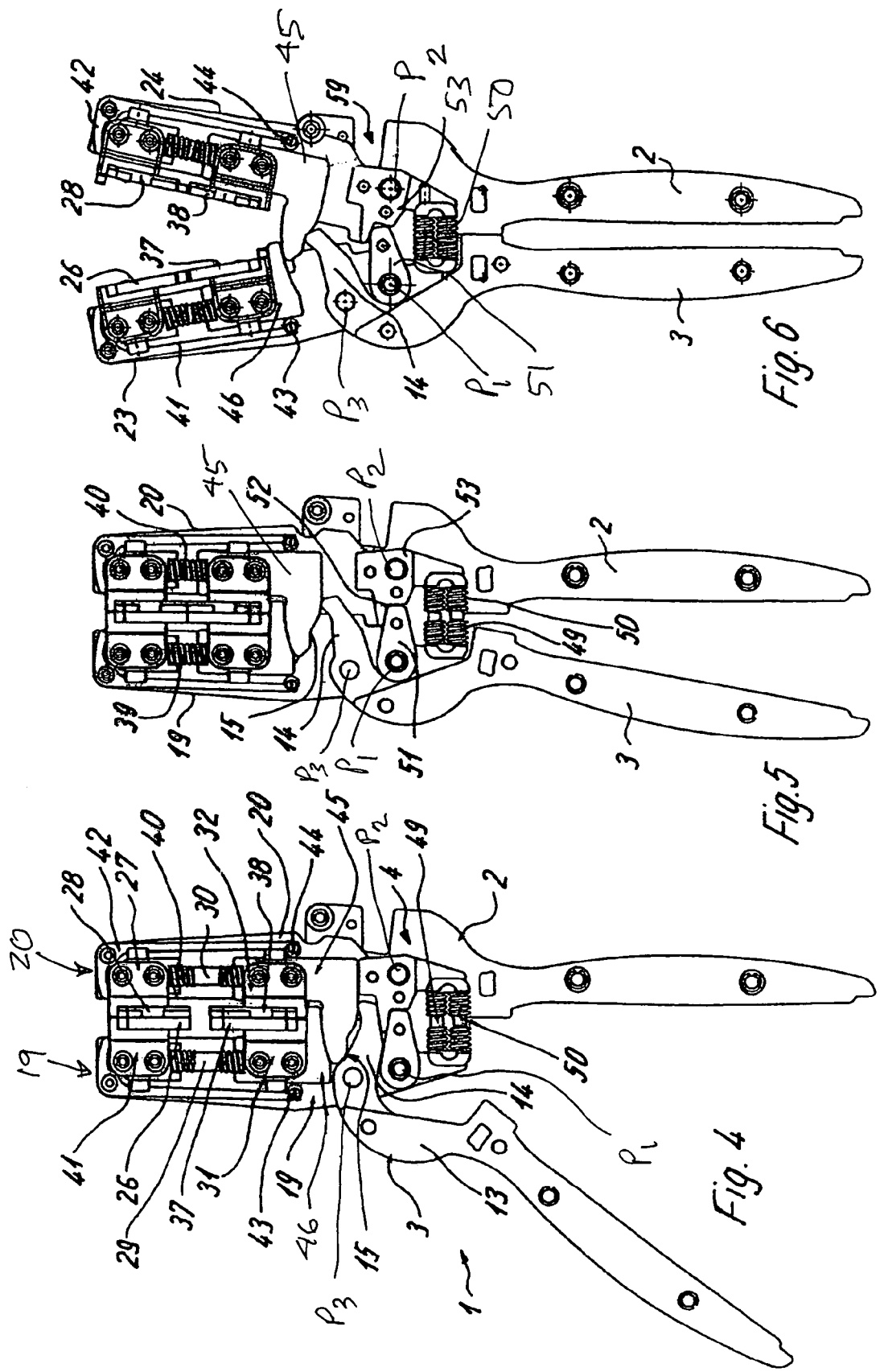

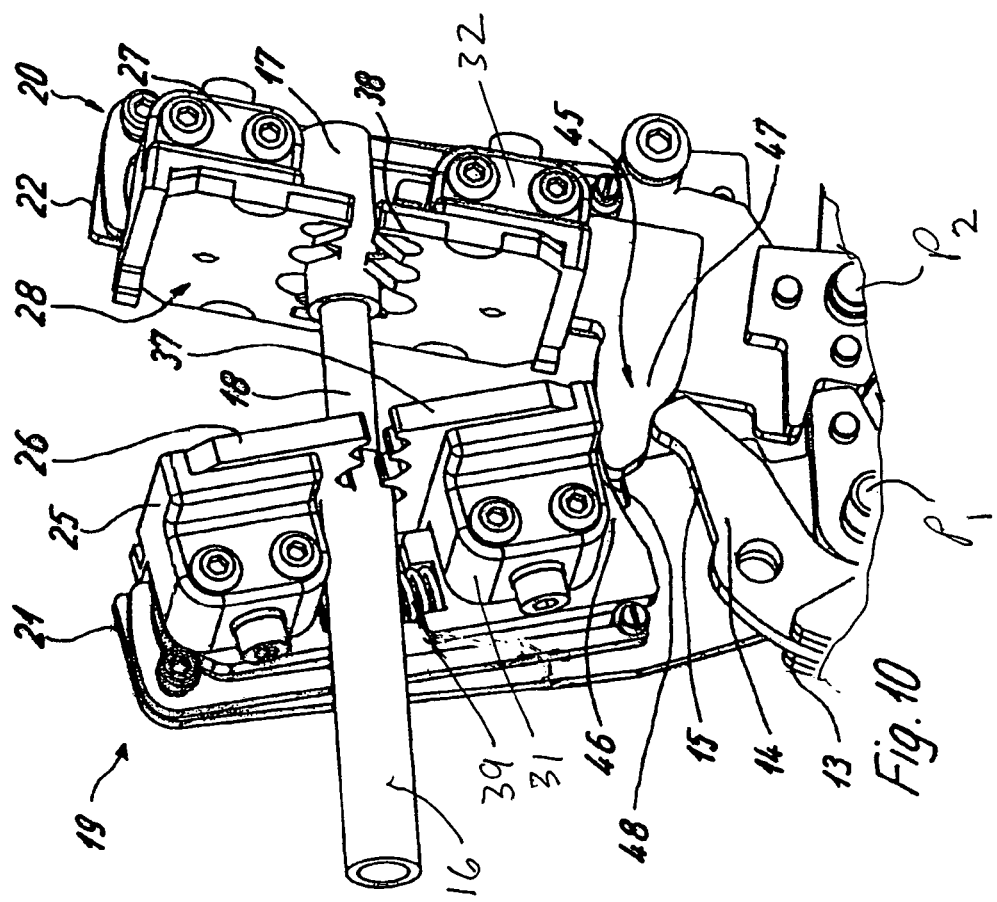
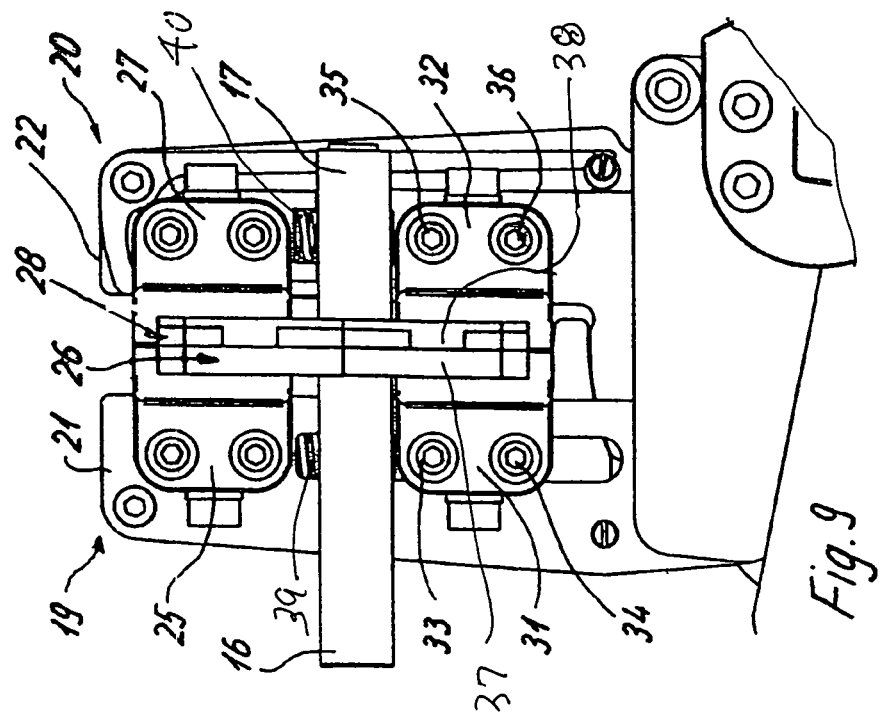

INSULATION STRIPPING TOOL

BACKGROUND OF THE INVENTION

1. Field of the Invention

A pliers-type stripping tool includes a base, a pair of pivot levers pivotally connected with the base, a pair of clamping members connected for relative longitudinal displacement on one of the pivot levers, a pair of cutting members connected for relative longitudinal displacement on the other of said pivot levers, first and second spring means biasing apart the clamping jaws and the cutting jaws, respectively, and first operating means including a pair of pivotally connected handles operable to displace the clamping and cutting jaws together from their normal separated conditions toward adjacent positions in engagement with an insulated conductor positioned therebetween. Owing to the spring biasing means, a certain degree of tolerance is provided to compensate for variations in the diametric dimensions of the insulated conductor components. The cutting members sever a length of the insulation layer, and second operating means are operable by the handles to separate the pivot levers, thereby to strip from the bare conductor the length of severed insulation.

2. Brief Description of the Prior Art

Insulation stripping tools of the pliers type are well known in the prior art, as evidenced, for example, by the German patent No. DE 79 33 957 U1. This tool includes two clamping jaws and two stripping knives which operate in a pulling manner, that is to say, one clamping jaw each and a stripping knife are pulled in case of activation against a fixed clamping jaw and a fixed stripping knife. The movable clamping jaw and the stripping knife are not coupled together so that the movable clamping jaw and the stripping knife can be applied against the conductor independently of each other.

It is also known that one can provide a two-knife arrangement including two stripping knives each on stripping pliers that are arranged "back to back" with adjacent cutting areas. This can be advantageous because one does not leave any imprint of the clamping jaws on the conductor, which, under certain circumstances, could even damage the conductor, and because the very sharp knives can securely prevent the conductor from slipping through. On the other hand, separation with the two knife arrangement, positioned back to back, consisting of two stripping knifes each, is not always advantageous because that can result in an unsightly cutting result. The known stripping tools of this pliers design have the disadvantage that they have an extensively asymmetrical structure, something that makes production more expensive due to the large number of required parts and, moreover, the user finds handling this device to be rather difficult.

The present invention was developed to provide an improved pliers-type insulation stripping tool by means of which, using appropriate handling procedures, it is possible in a simple manner to provide a tolerance compensation for varying conductor diameters. Preferably, as an alternative, there is provided both a design with two clamping jaws and two stripping knives as well as an arrangement with an arrangement including two knives lying next to each other with two stripping knives each.

A certain degree of play is provided between the clamping and/or the cutting jaws due to the resilient action of a spring means with some degree of play in each case, which play is so designed that conductor tolerances, when clamping a conductor or when cutting the insulation end, can be equalized in a resilient manner.

According to manufacturer's data, conductors with the same nominal cross-section also differ somewhat from each other individually because, for instance, a single-wire, fine-wire, or multi-wire conductor may display a somewhat varying diameter. Therefore, the additional resilient arrangement also of the upper clamping jaw and the upper stripping knife or two stripping knives will have an advantageous effect in terms of "tolerance equalization."

It is possible to combine the advantages of a clamping jaw arrangement and a stripping knife arrangement with each other because, on the one hand, it is advantageous to cut the conductor only with one stripping knife pair in order to avoid an unsightly double cut and, on the other hand, it is advantageous to hold the conductor in a defined fashion with one clamping jaw pair. However, according to the state of the art, the absence of tolerance equalization for conductors that allegedly have the same cross-section turned out to be a problem. These problems are solved by the present invention in a simple and effective way. The pliers are distinguished by comfortable handling capability.

The present invention makes it possible also to provide a dual knife arrangement with two movable and two fixed stripping knives each or—in a particularly preferred manner—one clamping jaw arrangement with two clamping jaws and one knife arrangement with two stripping knives.

BRIEF SUMMARY OF THE INVENTION

Accordingly, a primary object of the present invention is to provide a pliers-type insulation stripping tool including a pair of pivot levers that are connected with a base, a pair of clamping jaws mounted for relative displacement longitudinally of one pivot lever, a pair of cutting jaws being mounted for relative displacement longitudinally of the other pivot lever, spring means normally biasing said clamping jaws apart and said cutting jaws apart, and first operating means operable by pivotally connected handle means for clamping the insulated conductor and for severing the insulation layer. The resilient mounting of the clamping jaws and the cutting jaws provides a certain degree of tolerance, thereby to compensate for dimensional variations in the components of the insulated conductor.

According to another object of the invention, second operating means are provided that are operable by the handles to separate the pivot levers and thereby strip the severed length of insulation from the bare conductor.

A further object of the invention is to provide an insulation stripping tool wherein the cutting jaws consist of a plurality of spring-biased sections that are relatively laterally displaceable to a limited extent, thereby to provide a degree of tolerance to compensate for variations in the dimensions of the conductor components.

BRIEF DESCRIPTION OF THE DRAWINGS

Other objects and advantages of the invention will become apparent from a study of the following specification when viewed in the light of the accompanying drawings, in which:

FIGS. 1–3 are side elevation views illustrating the insulation stripping tool of the present invention in the initial conductor receiving condition, the conductor clamping and cutting position, and the final insulation stripping position, respectively, and FIGS. 4–6 are corresponding views with certain parts removed;

FIG. 9 is a detailed side elevation view of the tool when in the clamping and cutting condition of FIG. 8;

FIG. 10 is a detailed perspective view of the tool when in the final stripping condition of FIGS. 3 and 6;

DETAILED DESCRIPTION OF THE INVENTION

Figure 7:
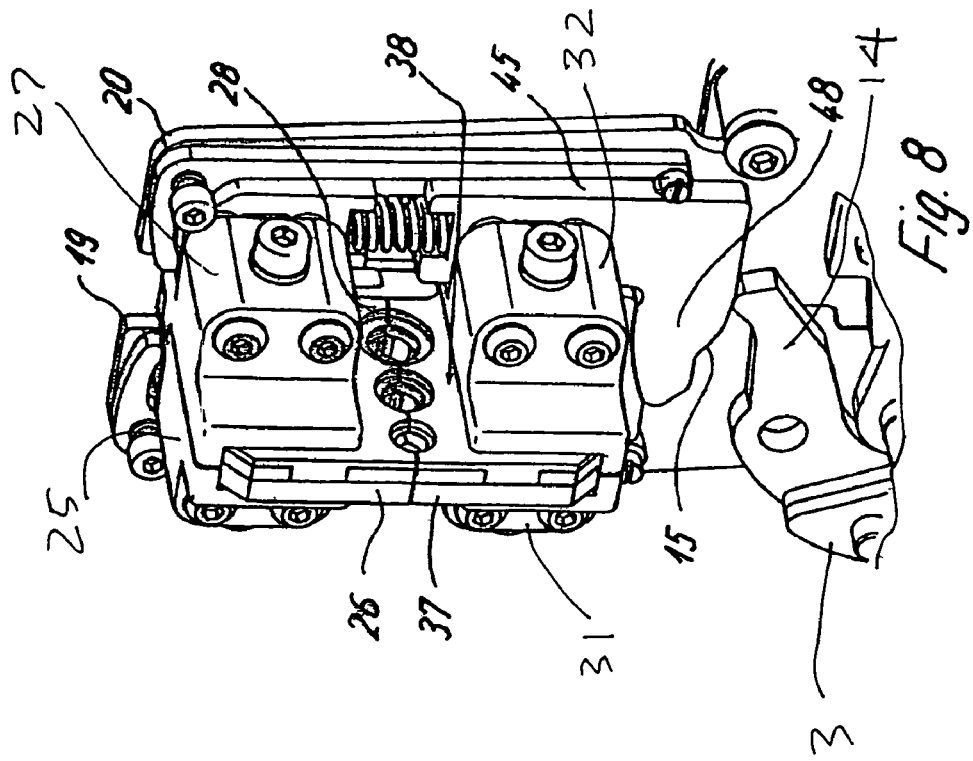
FIGS. 7 and 8 are detailed perspective views of the of the clamping and cutting means when in the initial conductor receiving condition and the clamping and cutting position, respectively.
Figure 8:
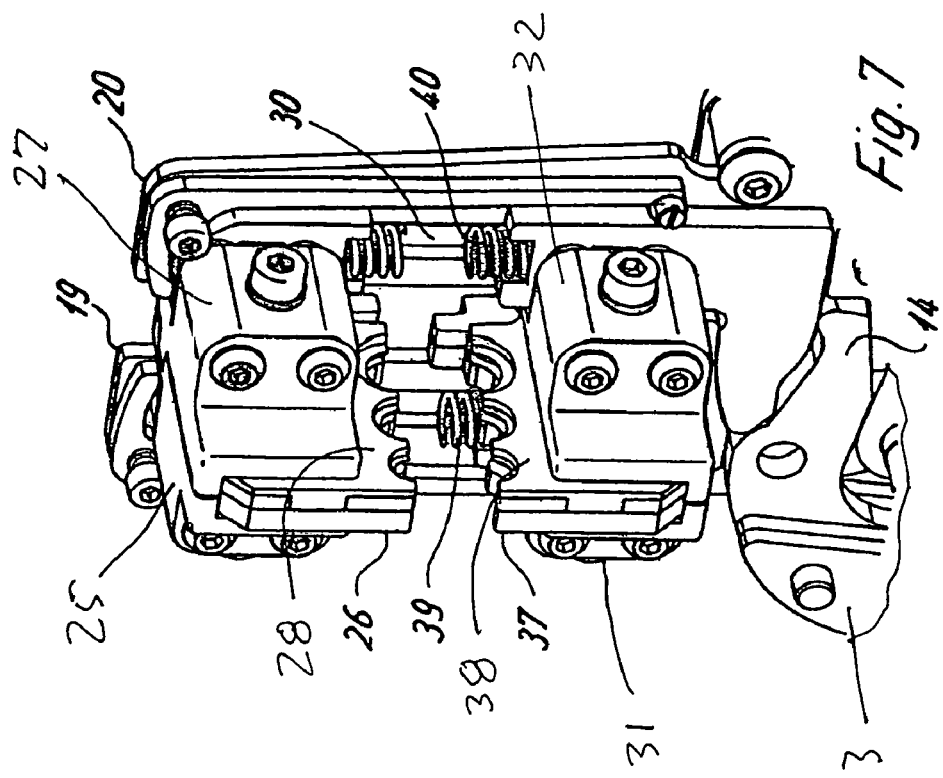
Figure 11:
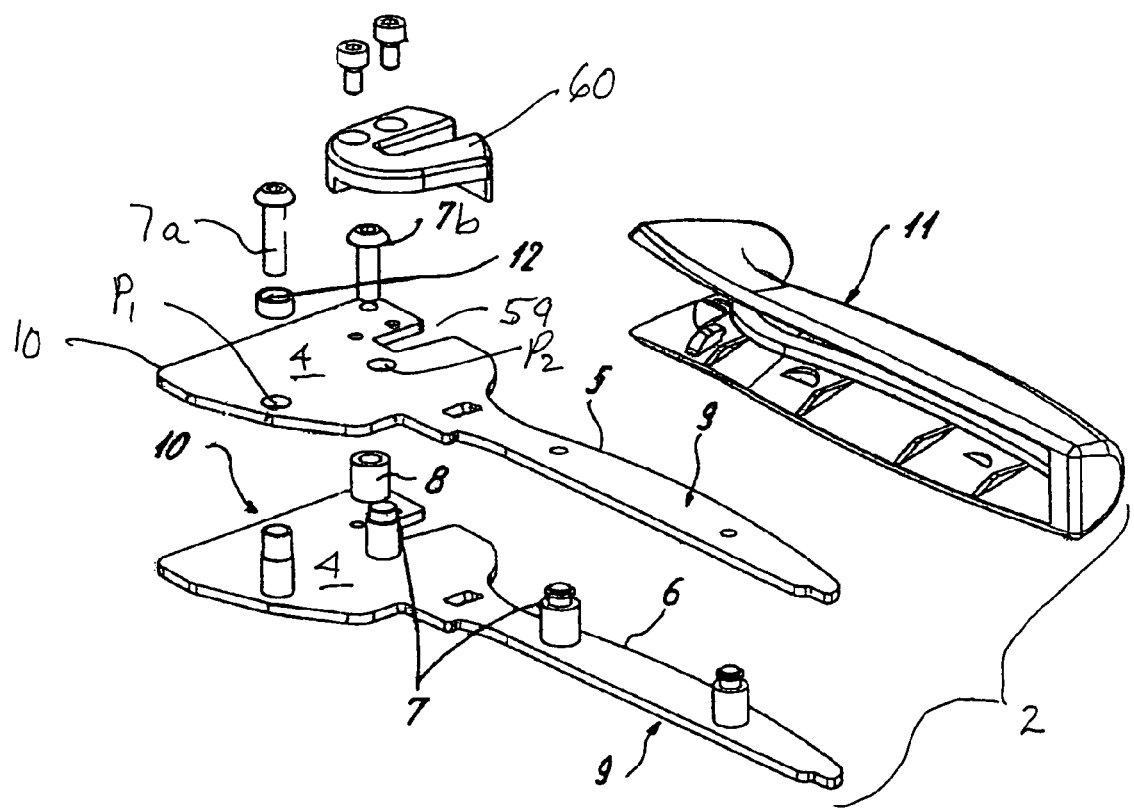
FIGS. 11 and 12 are exploded views of the handle and pivot lever components of the insulation stripping tool, respectively.
Figure 12:
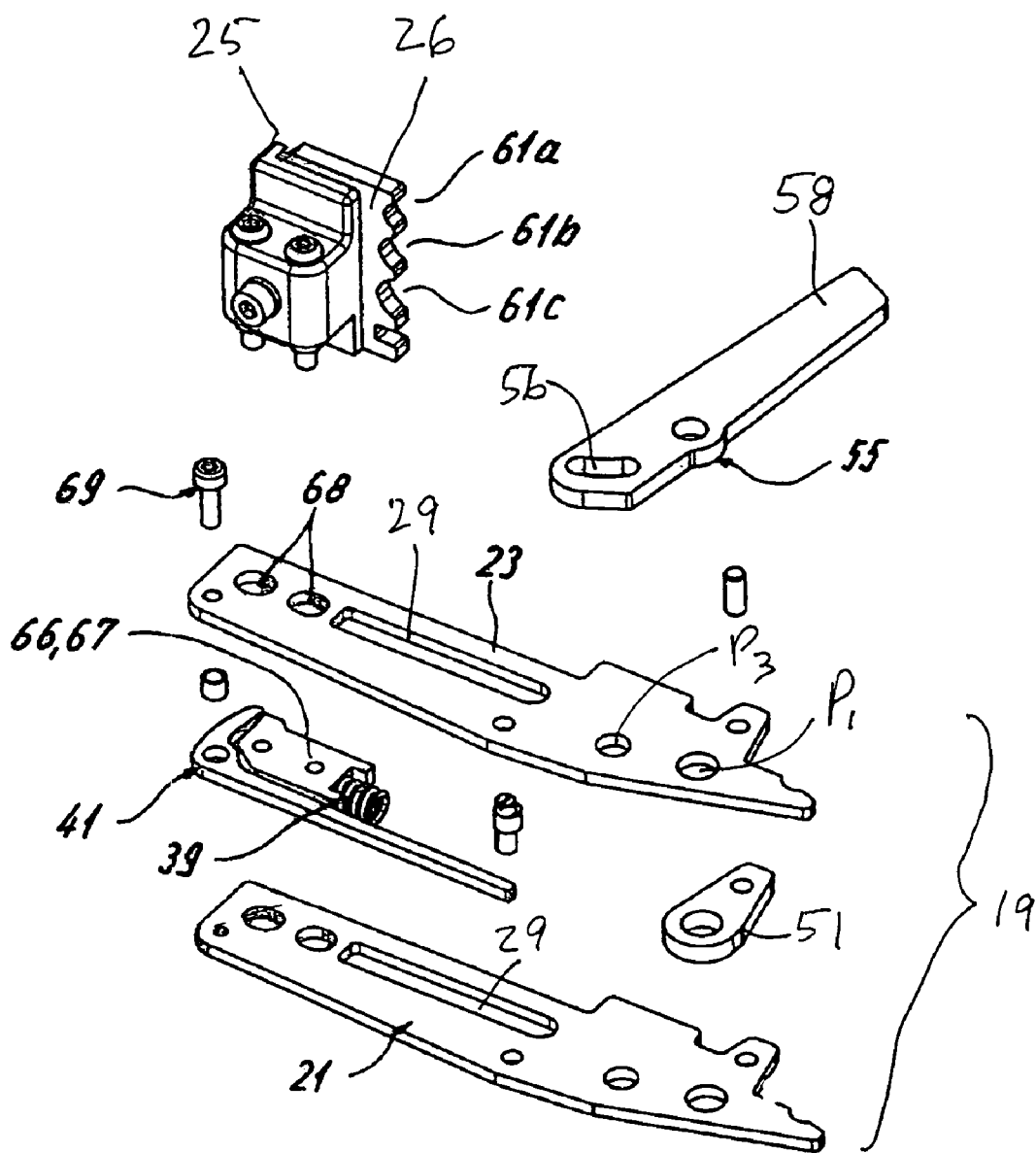
Figure 15:
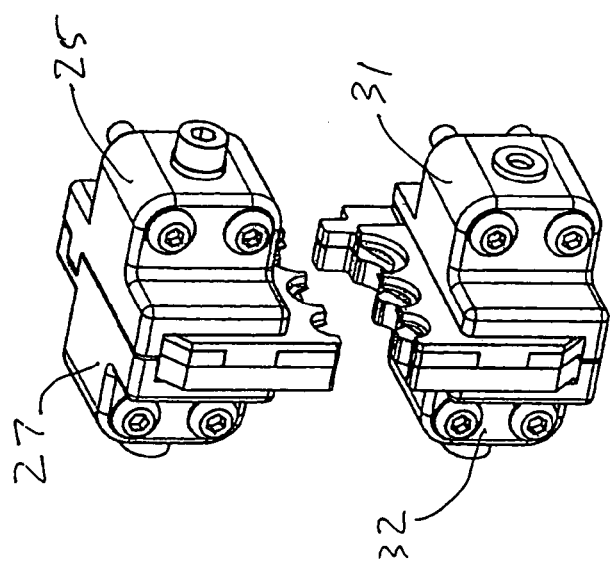
FIGS. 13–15 are detailed front, side and rear perspective views, respectively, of the clamping jaw, cutting jaw and support assemblies.
Figure 14:
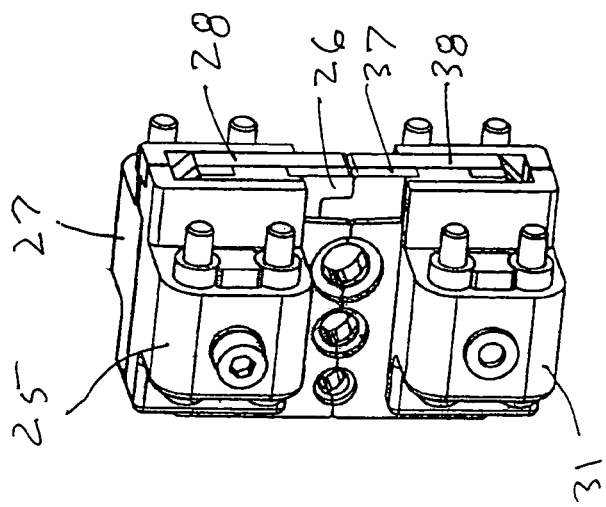
Figure 13:
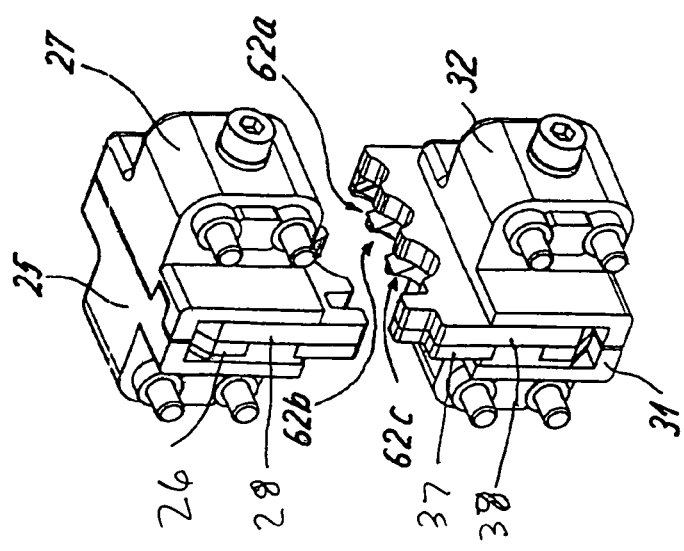
Figure 17:
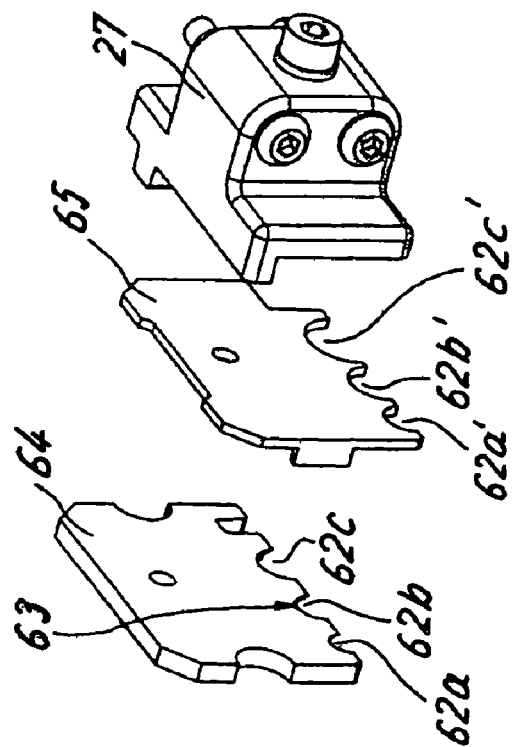
FIGS. 16 and 17 are front and rear exploded perspective views of a second embodiment of the cutting jaw and support assembly.

Referring first more particularly to FIGS. 1–6, the insulation stripping tool 1 of the present invention includes a pair of pivotally connected handles 2 and 3, and a pair of pivotally connected pivot levers 19 and 20. As shown in FIG. 11, the handle 2 includes an integral base portion 4 that carries the pivot pins 7a and 7b that define the pivot axes $P_1$ and $P_2$ of the pivot levers 19 and 20, respectively, as best shown in FIG. 6. The handle 2 includes a pair of parallel spaced sheet metal plates 5 and 6 that are separated by spacer pins 7 and cylindrical sleeves 8 to define a gap. A handle cover 11 formed of soft synthetic plastic material is mounted upon the handle portions 9 of the handle plates. Similarly, the pivot lever 19 (FIG. 12) includes a pair of parallel spaced metal lever plates 21 and 23 that contain at one end a first pair of aligned openings that define the first pivot axis $P_1$, and a second pair of aligned openings that define a third pivot axis $P_3$ (FIG. 6) about which the handle 3 is pivotally connected with the lever 19.

Referring now more particularly to FIGS. 7–10, in accordance with the present invention, there are mounted on the pivot lever 19 a fixed upper clamping jaw 26 and a relatively moveable lower clamping jaw 37. Mounted on the other pivot lever 20 are a fixed upper cutting jaw 28 and a relatively moveable lower cutting jaw 38. The upper jaws are supported by retainers 25 and 27 that are fixed by pin or screw means to the upper ends of the pivot levers 19 and 20, respectively. The lower clamping jaw 37 is supported by retainer 31 that is guided for movement by guide pins 33 and 34 that extend into the opposed longitudinal guide slots 29 contained in the lever plates 21 and 23 of FIG. 12. The lower cutting jaw 38 is supported by a retainer 32 that is similarly guided by guide pins 35 and 36 in longitudinal guide slots 30 (FIG. 7) contained in the spaced plates of the pivot lever 20. Helical springs 39 and 40 mounted in the gaps between the spaced plates of the pivot levers 19 and 20 bias the lower retainers 31 and 32 downwardly toward their separated conductor receiving positions of FIGS. 1, 4 and 7. The springs are supported by L-shaped supports 41 (FIG. 12) and 42 that support spring retainers 66 and 67, respectively. Eccentric pin means 43 and 44 (FIG. 4) are provided that cooperate with the lower ends of the L-shaped spring supports 41, thereby to provide means for adjusting the tensions of the helical springs 39 and 40, respectively. As will be described in greater detail below, the pivot levers 19 and 20 are biased by compression spring means 49 and 50 (FIG. 5) toward the closed condition of FIGS. 4, 5, and 7–9.

In accordance with an important feature of the invention, first operating means are provided that are operable by the handles 2 and 3 to displace the moveable clamping and cutting jaws 37 and 38 upwardly against the biasing force of springs 39 and 40, respectively, toward their clamping and cutting positions of FIGS. 2, 5, 8, and 9. These first operating means include a pair of cooperating cam plates 45 and 46 that are connected with the lower retainers 32 and 31, respectively, for operation by the handle 3 via an integral portion 14 that projects outwardly from the handle upper end. Thus, as best shown in FIGS. 4–10, when the handle 3 is pivoted about pivot axis $P_3$ toward the intermediate position of FIGS. 2, 5, 8, and 9, the projecting portion 14 on handle 3 engages the lower surface of the cam portion 47 of cam plate 45, and the upper surface of the cam portion 47 engages the corresponding lower cam surface 48 on the cam plate 46, as shown in FIG. 10, whereupon the moveable clamping and cutting jaws 37 and 38 are displaced upwardly toward their closed clamping and cutting positions against the restoring force of the biasing springs 39 and 40, respectively. During this pivotal separation of the pivot levers 19 and 20, the clamping jaws grip and firmly clamp the conductor 16, and the cutting edges on the cutting jaws sever the insulation in a circular pattern extending concentrically about the conductor.

According to another important feature of the invention, second operating means are provided for pivoting the pivot levers 19 and 20 apart from their closed positions of FIGS. 2, 5, 8, and 9 toward their separated stripping positions of FIGS. 3, 6 and 10 when the handles are pivoted from their intermediate positions of FIGS. 2 and 5 toward their fully closed positions of FIGS. 3 and 6. These second operating means include a further cam member 51 (FIG. 12) fastened in the gap between the lever plates 21 and 23 of pivot lever 19 for cooperation with a corresponding cam lug 53 fastened to the pivot lever 20. During this pivotal movement of the pivot levers toward the fully closed condition, the insulated conductor 16 remains clamped between the clamping jaws 26 and 37, and the severed insulation length 17 (FIG. 10) is stripped from the bare conductor 18, as shown in FIG. 10. Upon release of the gripping pressure on the handles 2 and 3, the springs 39 and 40 bias the moveable lower retainers 31 and 32 downwardly together with the plates plates 45 and 46, thereby to effect engagement of the cam portion 47 of plate 45 with the cam surface 15 on the lever projecting portion 14 (FIG. 10), whereby pivot lever 3 is pivoted outwardly toward its initial open position of FIGS. 1 and 4.

In accordance with another feature of the invention, conductor cutting means 54 (FIG. 1) are provided for transversely completely cutting the insulated conductor. These cutting means include a slot 59 contained in handle 2 for receiving an insulated conductor arranged transversely of the tool, and a knife member 55 pivotally connected intermediate its ends with the base 4 for pivotal movement about the first pivot axis $P_1$. At one end, the knife contains an arcuate slot 56 that receives an operating pin 57 mounted on the handle 3. Thus, as shown in FIGS. 1–3, as the handle 3 is pivoted toward the closed position relative to the handle 2, the free end 58 of the knife is displaced upwardly, thereby to completely cut an insulated conductor that has been inserted within the slot 59. These cutting means may be provided with a protective cap 60 formed of a synthetic plastic material, which cup is fastened to the handle 2 as shown in FIG. 11.

Referring again to FIG. 12, in order to permit a limited degree of play between the upper jaws and their respective pivot levers, the attachment holes 68 contained in the pivot levers are oversized relative to the fastening pins 69 for the upper retainers 25 and 27, respectively.

Operation

In operation, a conductor 16 is placed between the separated clamping jaws 26, 37 and the separated cutting jaws 28, 38 (FIGS. 1 and 4), and then the two handles 2, 3 are compressed together. In the process, handle portion 14 engages cam portion 47 and cam surface 48 of the cam plates 45, 46 (that can also be molded directly upon retainers 31, 32) in the longitudinal slots 29, 30 away from handles 2, 3 and upward, while the screw springs 39, 40 are compressed. Furthermore, conductor 16 is clamped by clamping jaws 26, 37 and the insulation of the conductor 16 is cut (FIG. 9). Upon continued operation of handle 2, pivot levers 19, 20 move away from each other because the fixed cam member 51 of one pivot lever 19 cooperates with an additional radial cam surface 52, specifically, in this case, an additional cam lug 53 on the second pivot lever 20, whereby cam member 51 and this radial cam are so designed that upon further compression of the handles 2 and 3, the pivot levers 19, 20 will move away from each other or will be opened. During this opening process, the severed insulation 17 is stripped off conductor 16 (FIG. 10).

The opening movement of clamping jaws 26, 37 and of cutting jaws 28, 38 takes place on the basis of the geometry of the radial-cam surface 15 of one cam plate 45 prior to the opening of the handles 2, 3. In the process, the screw springs 39, 40 operate upon the lower clamping jaw 37 and the lower cutting jaw 38 and bias the same back toward their starting positions. Compression springs 49, 50 also cause the return opening movement of handles 2, 3.

Because the upper cutting jaw 28 and especially also the upper clamping jaw 26 are resiliently supported with some play upon pivot levers 19, 20, one can in a simple manner provide tolerance compensation for the individual conductor geometry in spite of slightly inaccurate insertion of a conductor into the clamping jaw arrangement.

Here, first of all, both clamping jaws 26, 37 and the cutting jaws 28, 38 contain a plurality of recesses 61a, 61b, . . . as well as 62a, 62b, . . . of different size or with different diameter. In this way, one can accommodate various conductors in accordance with their diametric size.

According to manufacturer's information, conductors 16 with the same cross-section will differ from each other individually to some extent, because, for example, single-wire or multi-wire conductors have a somewhat different diameters where the additional "resilient" arrangement also of the upper clamping jaw 26 and the upper cutting jaw 38 will have a tolerance-compensating effect.

Theoretically, it is also conceivable that one might insert two cutting jaw pairs into the retainers. The design with one clamping jaw pair and one cutting jaw pair, however, is definitely preferred.

Figure 16:
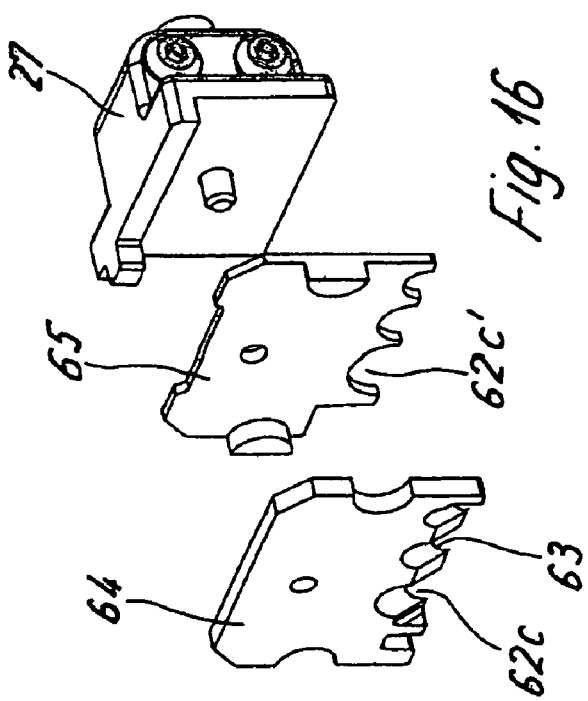

As shown in FIG. 16, at least one of the cutting jaws 28, 38 can also in a particularly advantageous manner have a multipart sectional structure including a pair of metal plates 64, 65 of which one has the actual cutting edges 63, while the other plate has corresponding recesses 62a', 62b' matching the recesses 62a, 62b, . . . of section 64, or of the actual cutting jaw that guides and positions the conductor 16. Preferably, the recesses 61a, 61b, . . . of at least one of the clamping jaws and/or recesses 62a, 62b of the stripping knife have a semicircular configuration or in a particularly advantageous manner (or according to a segment by segment modification), can also have a greatly tapering geometry (for example, an acute-angle shape, as shown in FIGS. 13–16) in order thus advantageously to influence the procedure of centering the conductor and to create the spaces for conductor insulation (below the projections).

The handles of the pliers-type tool are not completely symmetrical, of course, especially with regard to handles 2, 3, but they are also distinguished by a pleasant operating sensation that can be compared to a symmetrical pair of pliers.

Figure 18:
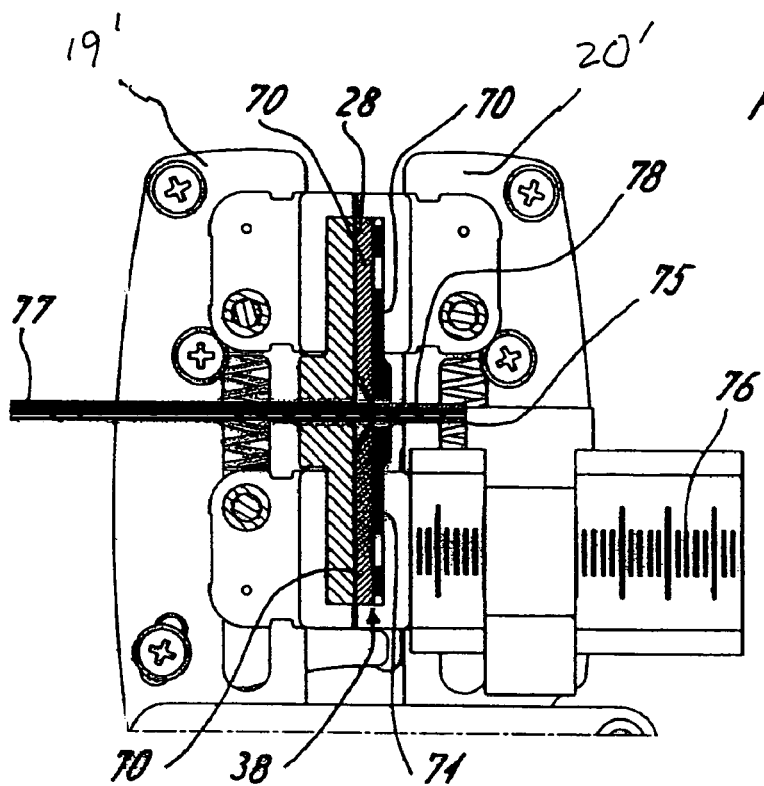
FIGS. 18 and 19 are side elevation views of another embodiment of the insulation stripping tool when in the clamping and stripping positions, respectively.
Figure 19:
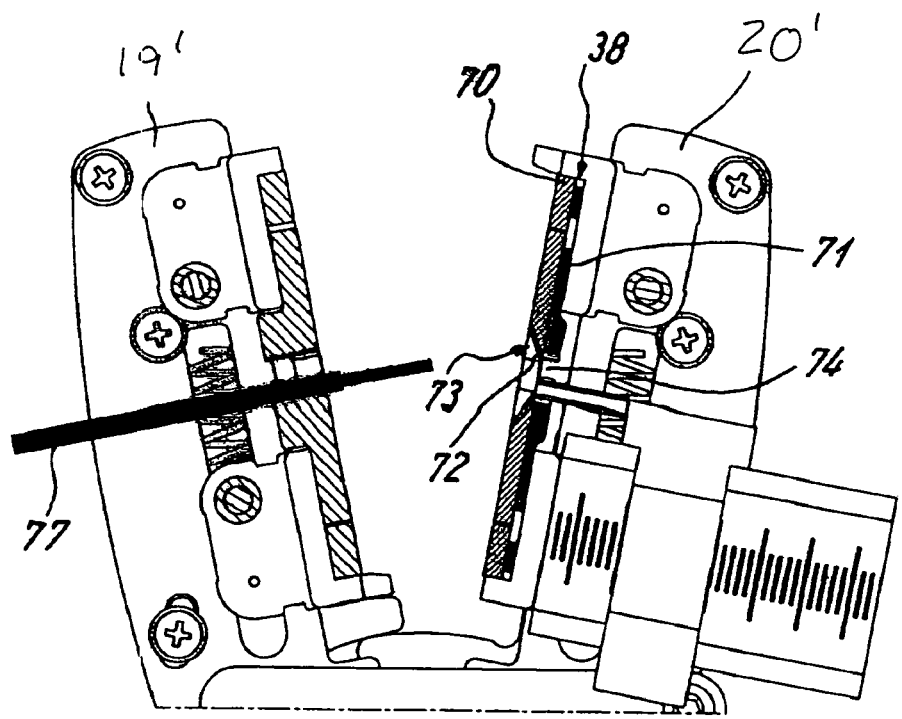
Figure 20A:
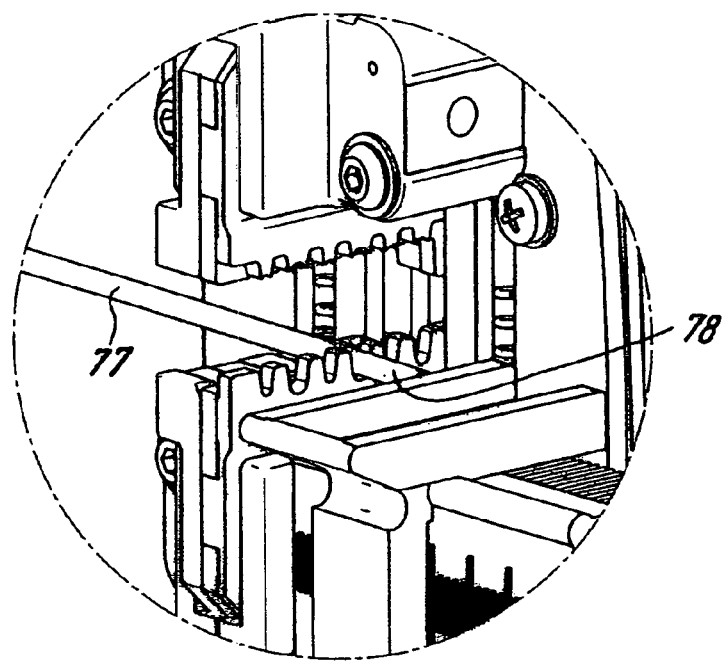
FIGS. 20a and 20b are detailed perspective front and rear views, respectively, of the clamping and cutting jaw assemblies when in the initial conductor introducing condition.
Figure 20B:
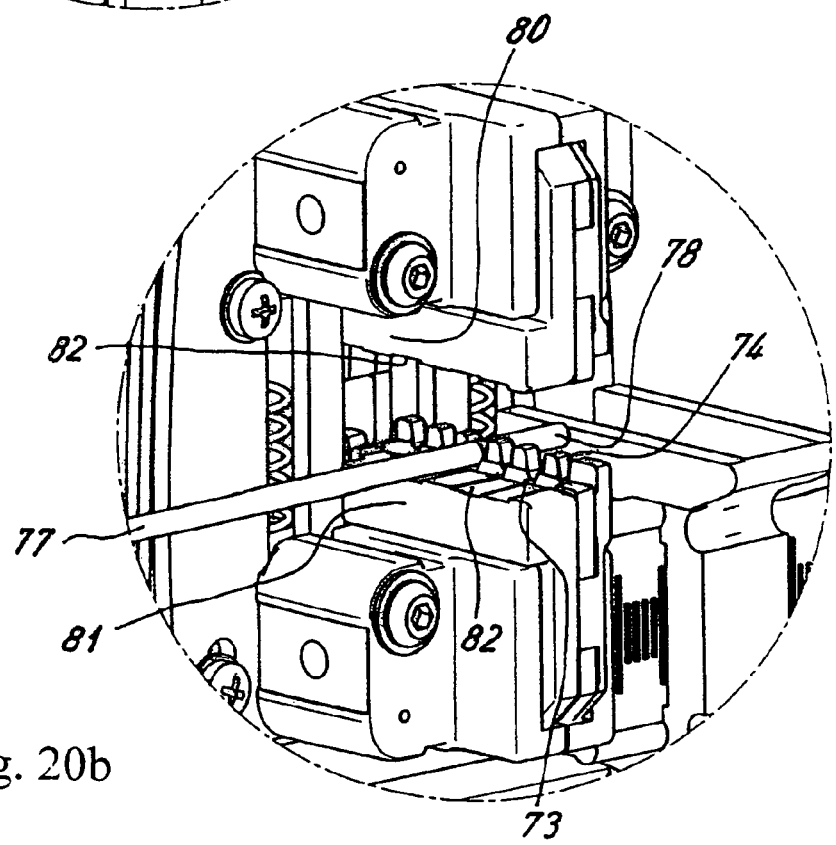
Figure 21A:
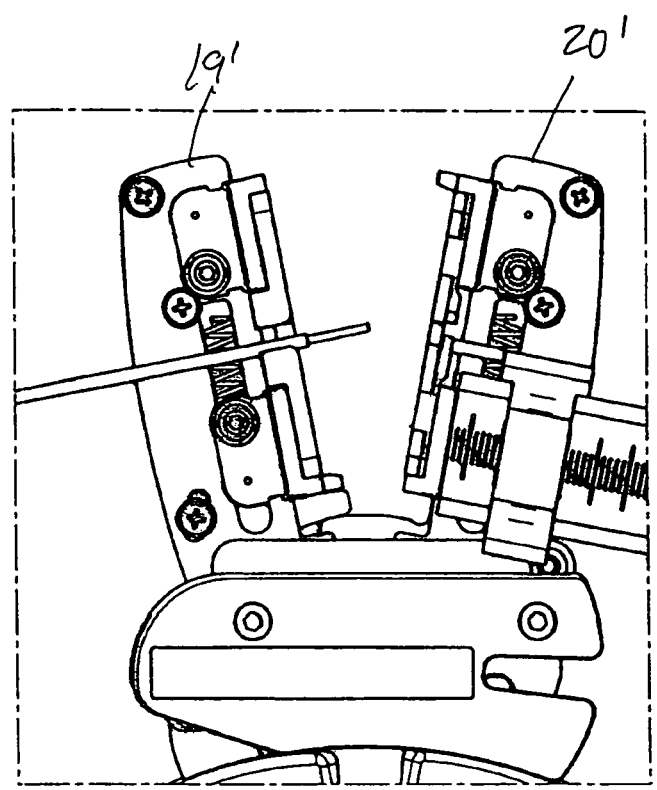
FIGS. 21a–21d are detailed side elevation and perspective views illustrating the clamping and cutting jaw assemblies when in the stripping condition.
Figure 21B:
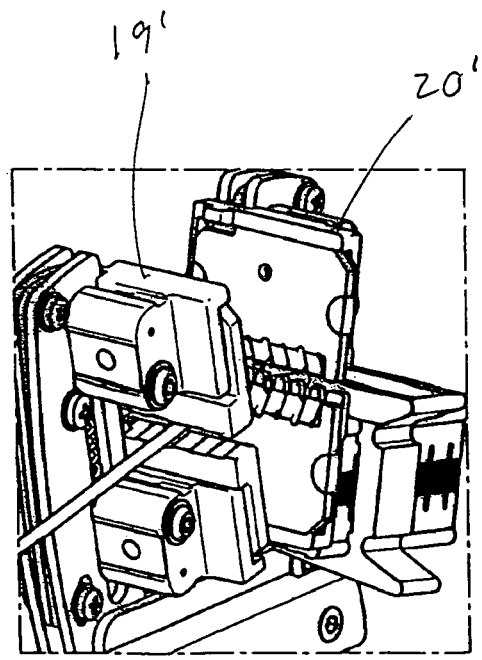
Figure 21C:
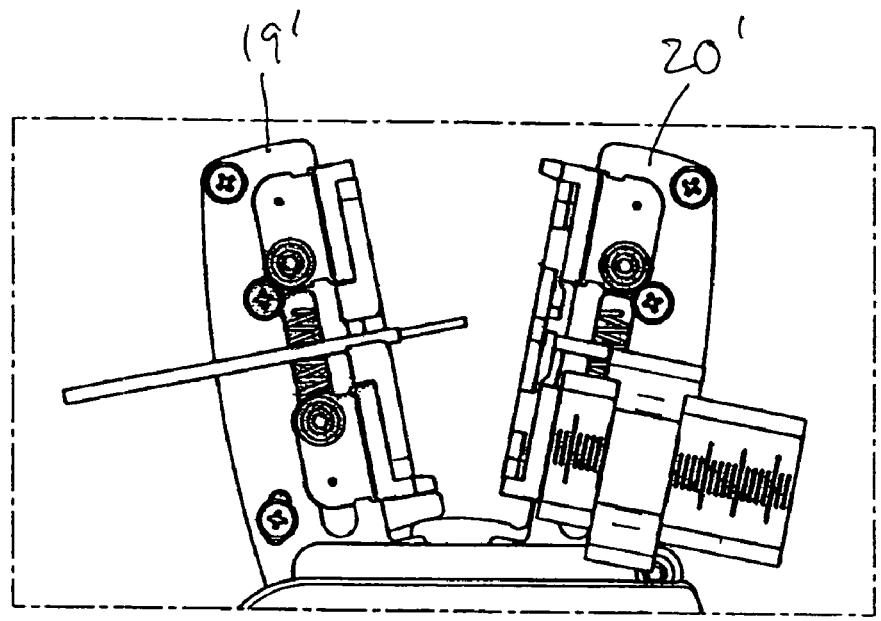
Figure 21D:
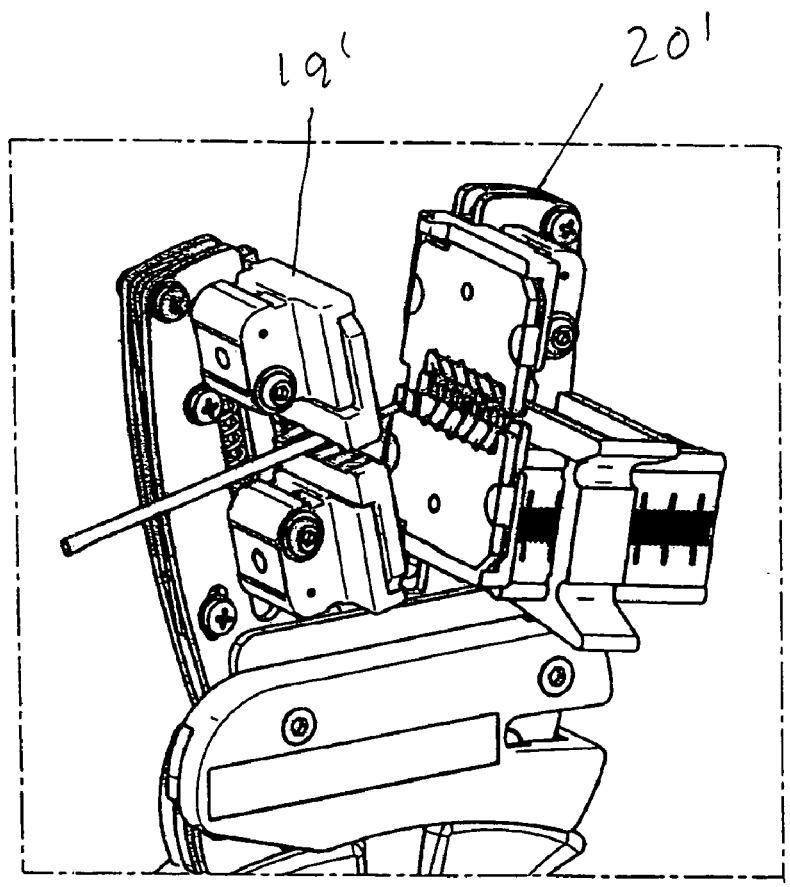
Figure 22A:
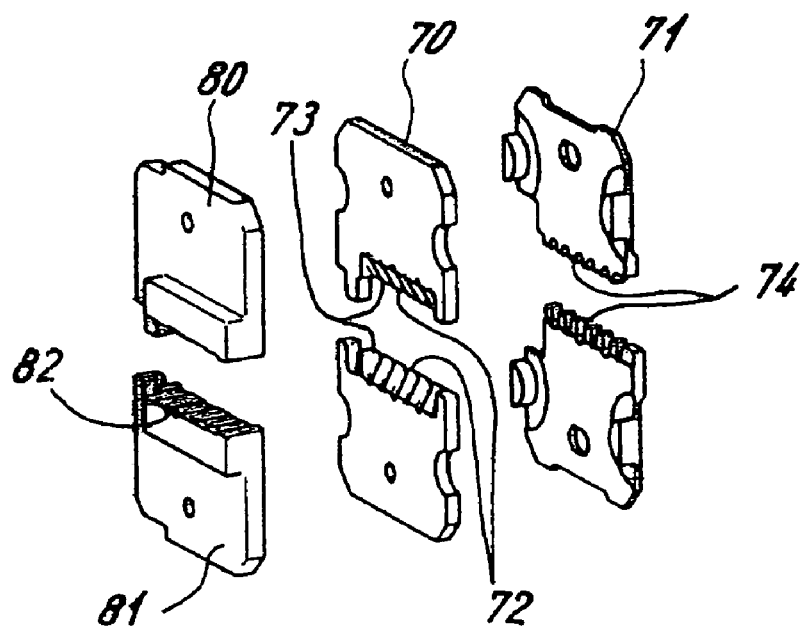
FIGS. 22a and 22b are front and rear exploded perspective views of another embodiment of the clamping and cutting jaw assembly.
Figure 22B:
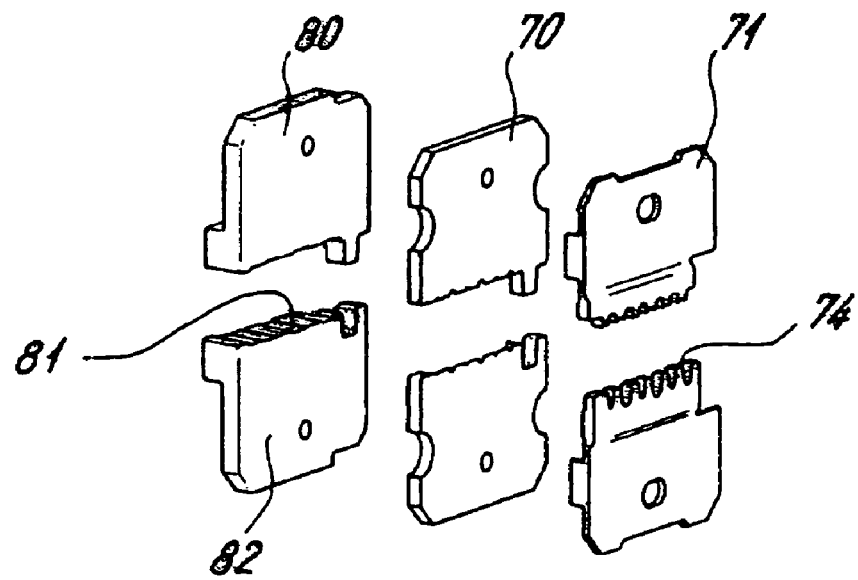

Referring now to FIGS. 18 and 19, another embodiment of the stripping pliers is disclosed having certain structural differences relative to the embodiment of FIGS. 1–17, especially with regard to the design of the cutting knives. According to FIGS. 18 to 22, both the upper and the lower cutting jaws 28, 38 of the second pivot lever 20 comprise two cutting jaw sections 70, 71, one of which has the actual cutting edge 72 with several recesses 73 placed next to each other for several conductors having the same diameter or for conductors having different diameters (depending on the design), and in each case other corresponding recesses 74 that guide and position the conductor. Recesses 73 on the cutting edge preferably are designed essentially in a semicircular manner at least on their bottom so that, in particular, a thin conductor will be guided, fixed and cut in an optimum fashion.

The essential point here is that cutting jaw section 71 works as a guide plate that rests contiguously against cutting edge 72 of the actual cutting jaw or of the cutting jaw section plate 70 with cutting edge 72. As a result, the conductor cannot slip away evasively during cutting and is positioned in an optimum fashion and is cut precisely. FIG. 18 additionally shows the provision of a conductor stop 75 on the second clamping jaw that is adjustably arranged on a measuring scale 76 so that the length of the insulation layer 78 that is to be removed from conductor 77 can be variably adjusted in a simple manner. The upper and lower clamping jaws 80, 81 in the first hand lever do not have any contour that would be adapted to the conductors in a form-locking manner, but instead, they have flat recesses or steps 82 that essentially have a rectangular cross-section and that in each case are somewhat wider than the diameter of conductor 77 that is to be stripped of its insulation so that the latter, prior to firm clamping, are somewhat movable in the area of the clamping jaws and automatically will take up or find the particular optimum clamping position.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A pliers-type insulation stripping tool for cutting and removing from an insulated conductor (16) a length (17) of the insulation layer thereof, comprising:
   (a) a base (4);
   (b) a pair of pivot levers (19, 20) pivotally connected with said base for pivotal movement about first ($P_1$) and second ($P_2$) pivot axes, respectively wherein the first and second pivot axes are spaced apart from one another;

(c) a pair of clamping jaws (26, 37) mounted on one of said pivot levers (19) for relative displacement in the longitudinal direction thereof between separated and adjacent clamping positions, respectively;

(d) a pair of cutting jaws (28, 38) mounted on the other of said pivot levers (20) for relative displacement in the longitudinal direction thereof between separated and adjacent cutting positions, respectively;

(e) first and second springs (39, 40) biasing said clamping jaws and said cutting jaws toward their relative separated positions, respectively, thereby to permit the insertion of the insulated conductor between said pairs of clamping jaws and cutting jaws, respectively;

(f) a pair of handles (2, 3) connected with said base for relative pivotal movement about a third pivot axis ($P_3$) between a normal separated position and an adjacent position, respectively; and (g) first operating means (14, 45, 46) operable upon initial displacement of said handles from said separated position toward an intermediate position between said separated and adjacent positions for displacing said clamping jaws and said cutting jaws toward their adjacent clamping and cutting positions, respectively, thereby to clamp the insulated conductor and to sever the insulation layer with a certain degree of tolerance relative to the diametric dimensions of the insulated conductor.

2. An insulation stripping tool as defined in claim 1, and further including:

(h) third spring (49, 50) biasing said pivot levers toward their adjacent position; and (i) second operating means (51, 52) operable upon displacement of said handle members from said intermediate position to said adjacent position to displace said pivot members toward their separated positions, thereby to strip the severed length of insulation from the insulated conductor.

3. An insulation stripping tool as defined in claim 2, wherein the second one of said handles (2) is integral with said base.

4. An insulation stripping tool as defined in claim 3, wherein each of said pivot levers includes a pair of parallel spaced congruent metal lever plates (21, 23; 22, 24) that define therebetween a gap, and spring retainer means (41, 66, 67) for supporting said first and second springs in said gaps, respectively, said lever plates containing longitudinal guide slots (29) that guide said movable clamping jaw and said movable cutting jaw, respectively.

5. An insulation stripping tool as defined in claim 4, wherein one of said clamping jaws is fixed to one of said pivot levers, and one of said cutting jaws is fixed to the other of said pivot levers, the others of said clamping and cutting jaws being movable relative to their associated pivot levers, respectively; and further wherein said spring retainer means (66, 67) are connected with said fixed clamping jaw and said fixed cutting jaw (26, 28), respectively.

6. An insulation stripping tool as defined in claim 5, and further including oversized boreholes and fastening pins (68, 69) connecting said fixed clamping jaw and said fixed cutting jaw for limited adjustment relative to their respective pivot levers, thereby to provide a degree of tolerance to compensate for variations in the diametric dimensions of the insulated conductor.

7. An insulation stripping tool as defined in claim 5, and further including a pair of eccentric pins (43, 44) for adjusting the tension of said first and second springs, respectively.

8. An insulation stripping tool as defined in claim 3, wherein said first operating means includes a projecting portion (14) arranged on said first handle, and a pair of cooperating sheet metal cam plates (45, 46) connected with said movable clamping jaw and said movable cutting jaw, respectively, said pair of cam members being operable by said first handle projecting portion to displace said movable clamping and cutting jaws toward the associated stationary clamping and cutting jaws, respectively.

9. An insulation stripping tool as defined in claim 1, wherein said pair of clamping jaws and said pair of cutting jaws each contain a plurality of opposed corresponding recesses of different sizes (61*a*, 61*b*; 62*a*, 62*b*), respectively, thereby to accommodate a plurality of insulated conductors of different sizes, respectively.

10. An insulation stripping tool as defined in claim 9, wherein each of said recesses has a semi-spherical cross-sectional configuration.

11. An insulation stripping tool as defined in claim 10, wherein at least some of said recesses are tapered in the longitudinal direction.

12. An insulation stripping tool as defined in claim 1, wherein at least one of said cutting jaws includes a plurality of contiguous sections (64, 65; 70,71) each having an edge containing at least one recess (62*a*, 62*a*'; 73, 74), each recess of a first one of said sections containing a cutting edge (63; 72).

13. An insulation stripping tool as defined in claim 12, wherein a second one of said cutting jaw sections (71) abuts the cutting edge (72) of said first cutting jaw section (70), said cutting jaw sections being connected for limited lateral adjustment relative to each other.

14. An insulation stripping tool as defined in claim 12, wherein each of said cutting jaws includes a plurality of said recesses (62*a*, 62*b*, 62*c*; 62*a*', 62*b*', 62*c*'; 73, 74) arranged in laterally spaced relation.

15. An insulation stripping tool as defined in claim 12, wherein each of said recesses has a semi-circular cross-sectional configuration.

16. An insulation stripping tool as defined in claim 12, wherein said clamping jaws (80, 81) having corresponding adjacent edge portions each containing at least one flat recess (82) having a generally rectangular cross-sectional configuration.

17. An insulation stripping tool as defined in claim 1, and further including scale means (76) and adjustable stop means associated with said clamping jaw for varying the length of the insulation layer that is stripped from the insulated conductor.

18. An insulation stripping tool as defined in claim 1, and further including conductor cutting means (54) operable by said handles for completely cutting the insulated conductor.

19. An insulation stripping tool as defined in claim 18, wherein said conductor cutting means includes a cutting slot (59) contained in one of said handles for transversely receiving the insulated conductor; and a knife member (55) operable by said handles for cutting the conductor when inserted in said cutting slot.

* * * * *